United States Patent
Sun et al.

(10) Patent No.: US 6,619,866 B1
(45) Date of Patent: Sep. 16, 2003

(54) DYNAMIC RANGE EXTENDED FOR OPTICAL TRANSMITTERS

(75) Inventors: Chen-Kuo Sun, San Diego, CA (US); Stephen A. Pappert, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/527,730

(22) Filed: Mar. 17, 2000

Related U.S. Application Data

(63) Continuation-in-part of application No. 09/071,220, filed on May 1, 1998, now abandoned.

(51) Int. Cl.[7] .............................................. H04B 10/02
(52) U.S. Cl. ..................... 398/141; 398/140; 398/147; 398/182; 398/183; 398/195; 398/200
(58) Field of Search ................................ 398/140, 147, 398/141, 182, 183, 195, 200

(56) References Cited

U.S. PATENT DOCUMENTS

| | | | |
|---|---|---|---|
| 4,393,518 A | * 7/1983 | Briley | ........................ 455/617 |
| 5,253,309 A | 10/1993 | Nazarathy et al. | |
| 5,282,072 A | * 1/1994 | Nazarathy et al. | ........... 359/157 |
| 5,680,238 A | * 10/1997 | Masuda | ........................ 359/132 |
| 5,777,777 A | * 7/1998 | Kaste et al. | .................. 359/245 |
| 5,825,518 A | * 10/1998 | Maeda et al. | ................ 359/124 |
| 5,940,196 A | 8/1999 | Piehler et al. | |
| 6,211,984 B1 | * 4/2001 | Yoshida | ........................ 359/161 |

* cited by examiner

Primary Examiner—Leslie Pascal
Assistant Examiner—Hanh Phan
(74) Attorney, Agent, or Firm—Andrew J. Cameron; James A. Ward; Michael A. Kagan

(57) ABSTRACT

A dynamic range extender for optical transmitters comprises a bipolar distortion compensator for increasing drive signal gain as the absolute level of an input signal increases beyond a selected input voltage threshold, a signal coupler for dividing the input signal into complementary signals, a unipolar distortion compensator for increasing drive signal gain of each complementary signal beyond a selected forward current threshold, a signal clipper for pre-clipping each complementary signal below a selected clipping threshold, and complementary driver outputs to drive each of a pair of laser diodes in a complementary push-pull arrangement. The pre-clipping prevents the laser diodes from being driven below their threshold current level, and the distortion compensation suppresses second and third order harmonic distortion when the complementary signals generated by the laser diodes are combined by differential photodiodes.

16 Claims, 13 Drawing Sheets

DYNAMIC RANGE EXTENDED FOR OPTICAL TRANSMITTERS

CROSS-REFERENCE TO RELATED APPLICATIONS

This is a continuation-in-part application under 37 CFR 1.53 of patent application "HIGH DYNAMIC RANGE FIBER OPTIC LINK", Ser. No. 09/071,220 filed on May 1, 1998, now abandoned.

LICENSING INFORMATION

The invention described below is assigned to the United States Government and is available for licensing commercially. Technical and licensing inquiries may be directed to Harvey Fendelman, Legal Counsel For Patents, Space and Naval Warfare Systems Center, San Diego D0012, 53510 Silvergate Avenue, San Diego, Calif. 92152-5765; telephone (619)553-3818; fax (619)553-3821.

BACKGROUND OF THE INVENTION

The present invention relates generally to linear amplifiers and particularly to fiber optic transmission links in which it is desirable to minimize linear distortion in high power RF signals.

Multi-channel broadband fiber optic transmission links using current-modulated laser diodes are limited in dynamic range by even and odd harmonic distortion products generated in response to frequency mixing products of the modulation signal. In particular, even and odd harmonic distortion limits multi-octave bandwidth performance, and third-order distortion limits sub-octave bandwidth performance. These non-linearities worsen as RF power to the laser diode is increased. As RF power to the laser diode is increased, clipping occurs when the laser diode is driven below the laser threshold current. Sub-threshold characteristics of laser diodes severely limit the useful dynamic range of fiber optic transmission links.

An optical signal transmission arrangement to reduce even harmonic distortion of a light emitting diode is described in U.S. Pat. No. 4,393,518 issued to Briley on Jul. 12, 1983. Briley divides an electrical input signal into a positive and a negative portion with respect to a selected reference level. These divided signals are transmitted independently through two optical transmitters and received by differential photodiodes to recover the original input signal. While this arrangement may reduce even harmonic frequency distortion, the light emitting diodes are operated only above the biasing point. Laser diode signal transmission systems, on the other hand, typically modulate the laser diodes above and below the biasing point.

Nazarthy et al., U.S. Pat. No. 5,253,309, issued on Oct. 12, 1993, discloses modulated optical transmission systems using two optical fibers to reduce second harmonic distortion, but does not compensate for signal clipping introduced by the electro-optical modulator's nonlinear transfer function.

Piehler et al., U.S. Pat. No. 5,940,196, issued on Aug. 17, 1999, discloses an optical transmission system that combines multiple signals having different wavelengths and identical modulation to increase signal-to-noise ratio, but does not compensate for signal clipping introduced by the electro-optical modulator's nonlinear transfer function.

SUMMARY OF THE INVENTION

A dynamic range extender for optical transmitters of the present invention comprises a bipolar distortion compensator for increasing drive signal gain as the absolute level of an input signal increases beyond a selected input voltage threshold, a signal coupler for dividing the input signal into complementary signals, a unipolar distortion compensator for increasing drive signal gain of each complementary signal beyond a selected forward current threshold, a signal clipper for pre-clipping each complementary signal below a selected clipping threshold, and complementary driver outputs to drive each of a pair of laser diodes in a complementary push-pull arrangement. The pre-clipping prevents the laser diodes from being driven below their threshold current level, and the distortion compensation suppresses second and third order harmonic distortion when the complementary signals generated by the laser diodes are combined by differential photodiodes.

An advantage of the dynamic range extender for optical transmitters of the-present invention is that high fidelity RF signals may be generated from laser diodes at high optical power levels.

Another advantage is that RF optical power levels of currently available laser diodes may be extended beyond their linear operating range while maintaining low harmonic distortion.

Still another advantage is that present invention may substantially increase the number of communication channels in parallel optical channel applications.

Yet another advantage is that the transmission range of a communications signal may be extended without sacrificing fidelity, reducing the number of repeaters and amplifiers required for multiple subscriber reception.

DESCRIPTION OF THE INVENTION

Figure 1A:
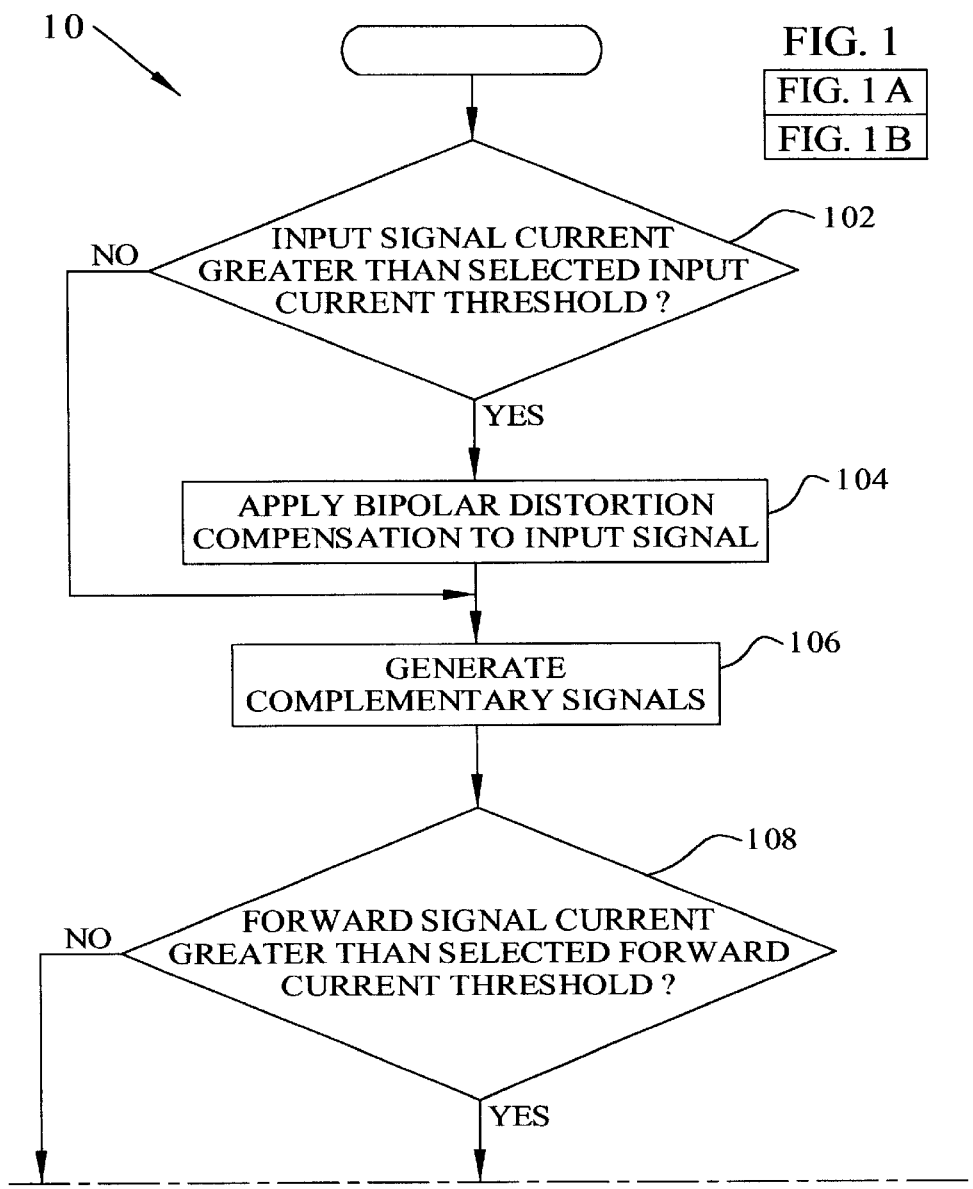
FIG. 1 is a flow diagram of a dynamic range extender for optical transmitters of the present invention for a fiber optic transmission link.
Figure 1B:
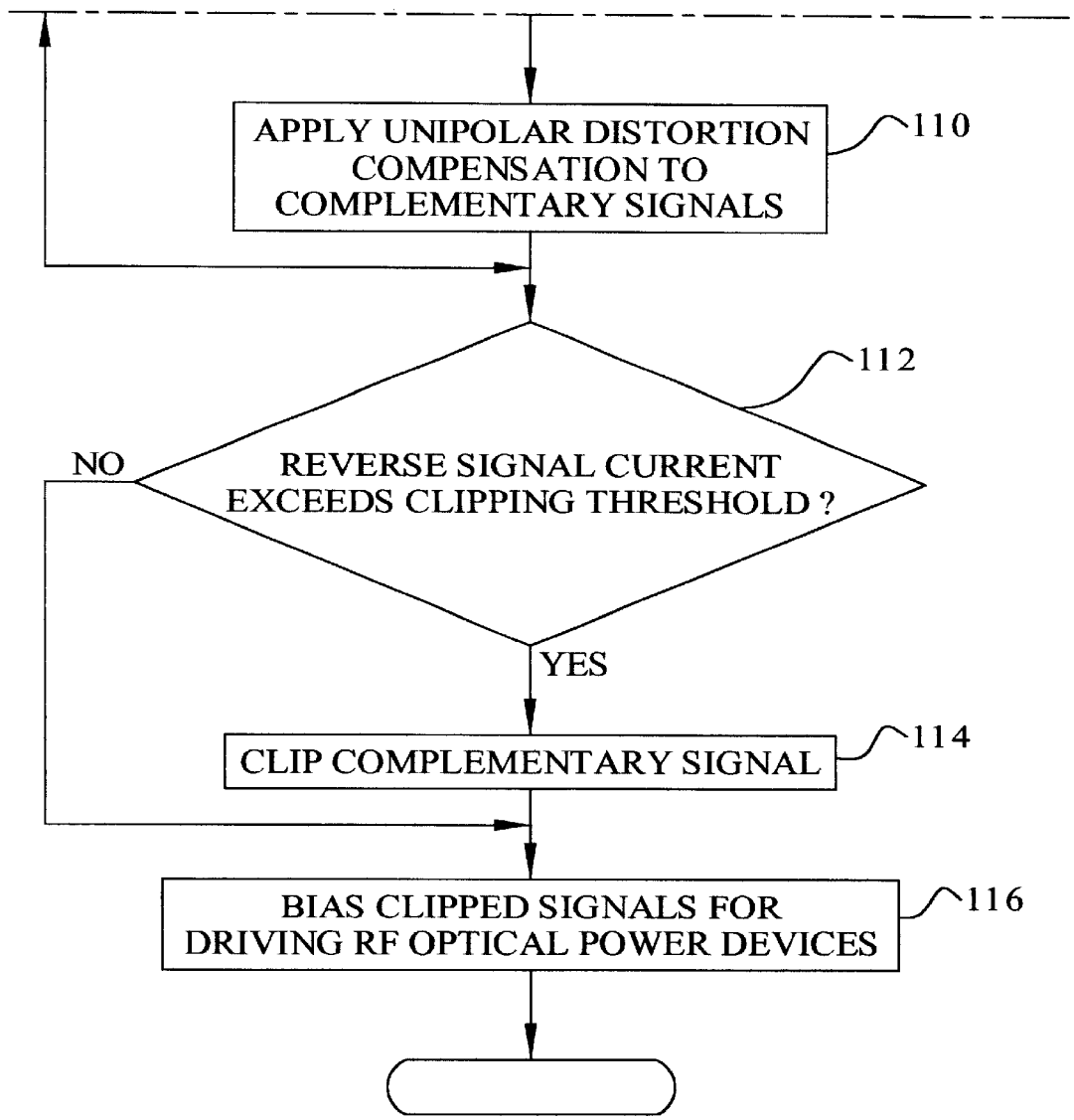

FIG. 1 is a flow diagram 10 of a dynamic range extender for optical transmitters of the present invention for transmitting RF optical power over a fiber optic transmission link. At step 102, the instantaneous current level of an RF input signal is compared to a selected input voltage threshold. If the absolute value of the input signal current exceeds the input voltage threshold, an optional bipolar distortion compensation may be applied at step 104 to boost the signal gain with current, compensating in advance for the nonlinear distortion due to clipping. Complementary signals, i.e., non-inverted and inverted signals, are generated from the compensated input signal at step 106. Each complementary signal level is compared to a selected forward current threshold at step 108. An optional unipolar distortion compensation may be applied at step 110 to further compensate in advance for nonlinear distortion in each complementary signal. At step 112, each complementary signal level is compared to a clipping threshold. When the reverse current of either complementary signal level exceeds the clipping threshold, the complementary signal is clipped at the clipping threshold. The complementary clipped signals are then biased at step 116 for driving RF power optical devices to generate complementary RF optical energy over the fiberoptic link substantially free of distortion at each cable drop and fanout station. The intended meaning of the term "clipper" with respect to the present invention is limited to a device that outputs a signal level substantially proportional to an input signal for input signal levels that are greater than a selected critical value and a constant signal level for input signal levels that are less than or equal to the critical value. It is important to note that while the distortion compensators of the present invention may compensate for non-linearity of an optical transmitter's transfer function at current levels within the optical transmitter's operating range, they specifically compensate for distortion typically produced by clipping at current levels below the optical transmitter's operating range. As a result, the linear RF-optical power output capability of the laser diodes is extended to the laser diode peak power rating, surpassing the present range between the laser threshold current and the upper end of the linear portion of the transfer function.

Figure 2A:
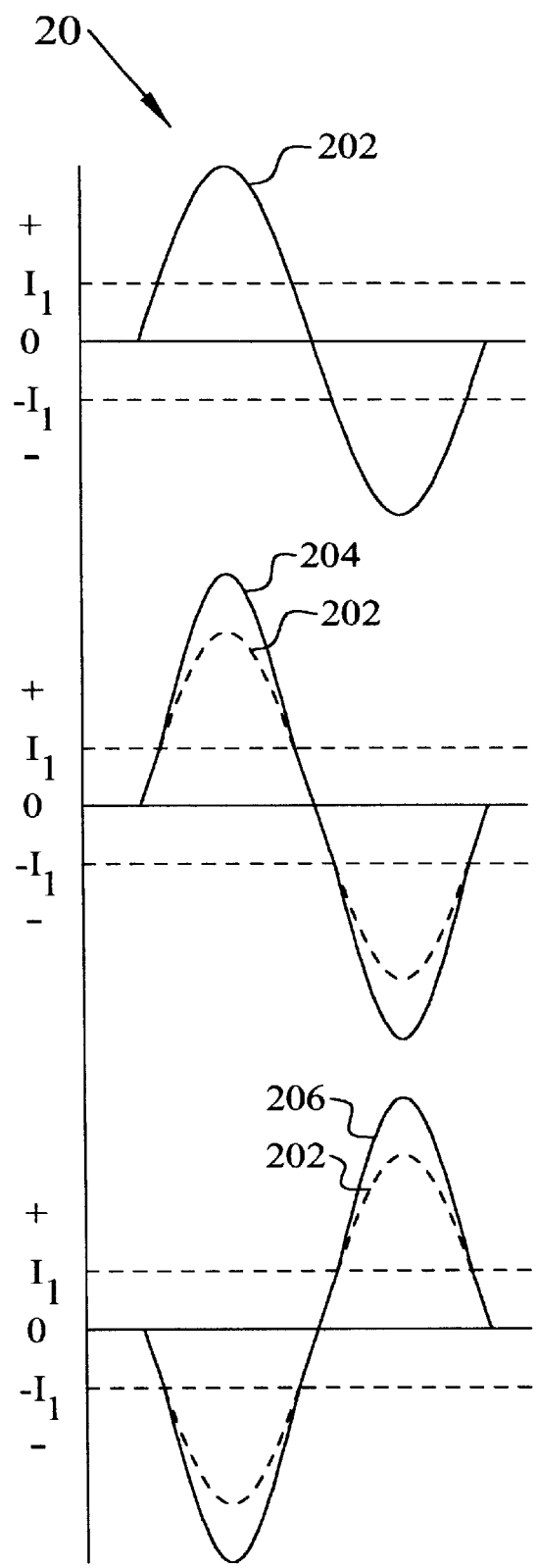
FIG. 2 is a set of exemplary current waveforms for the dynamic range extender of the present invention.

FIG. 2 is a set of exemplary current waveforms 20 that show the operation of the dynamic range extender on a sinusoidal RF input signal 202. When the absolute value of input current voltage 202 exceeds an input current threshold $I_1$, a bipolar distortion compensation is applied to boost the current level with increasing current as shown in plot 204. Plots 204 and 206 illustrate the complementary signals generated in step 106.

When the forward signal current of either complementary signal exceeds a forward current threshold $I_2$, a unipolar distortion compensation is applied to boost the current level of each complementary signal with increasing forward current as shown in plots 208 and 210.

When the reverse current of the compensated complementary signals exceeds a clipping threshold $I_C$, each compensated complementary signal is pre-clipped to generate complementary clipped signals as shown in plots 212 and 214. A laser bias $I_B=I_T+I_C$ is then added to bias the RF optical power devices to their operating current level as shown in plots 216 and 218. Applying the biased complementary clipped signals to the RF optical power devices generates optical signals that are modulated above the laser threshold current. When the optical signals are detected and differentially combined, the original input signal waveform is reproduced.

Figure 3:
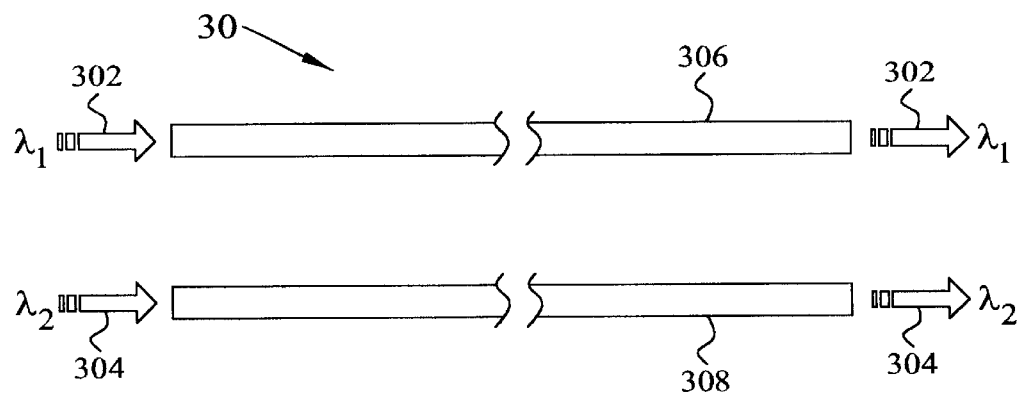
FIG. 3 illustrates transmission of complementary RF optical power signals on separate optical fibers.

FIG. 3 illustrates transmission of complementary RF optical power signals 302 and 304 over an optical link 30 on separate optical fibers 306 and 308 at wavelengths $\lambda_1$ and $\lambda_2$ respectively, where $\lambda_1$ may be equal to $\lambda_2$.

Figure 4:
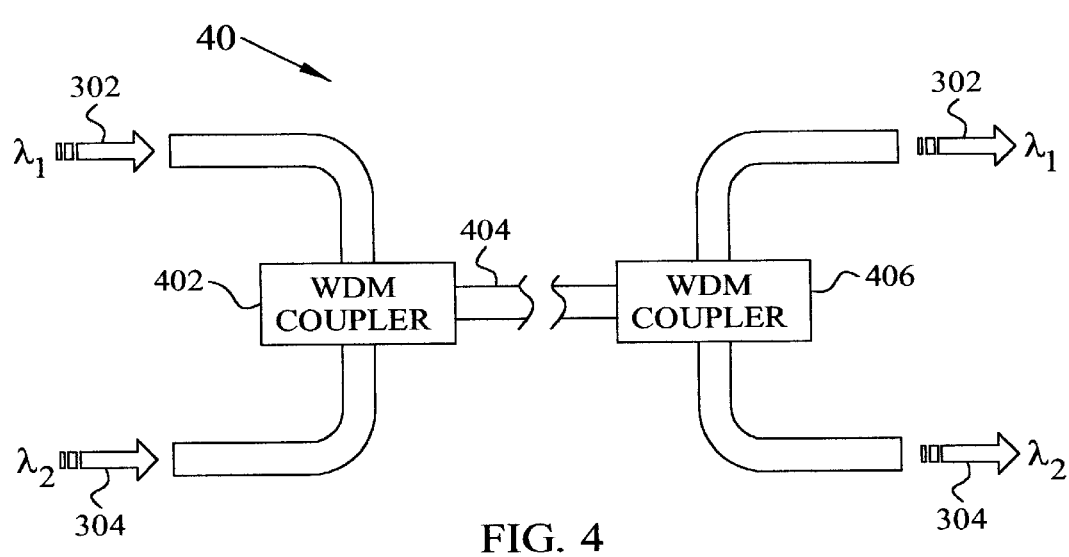
FIG. 4 illustrates transmission of complementary RF optical power signals on a single optical fiber using a wavelength division multiplexer.

FIG. 4 illustrates an alternate arrangement of an optical fiber link 40 that multiplexes RF optical power signals 302 and 304 on a single optical fiber 404 using a wavelength division multiplexer (WDM) coupler 402, where $\lambda_1$ and $\lambda_2$ are unequal. RF optical power signals 302 and 304 are transmitted through optical fiber 404 and demultiplexed with a WDM coupler 406 at the output end of optical fiber 404.

Figure 5:
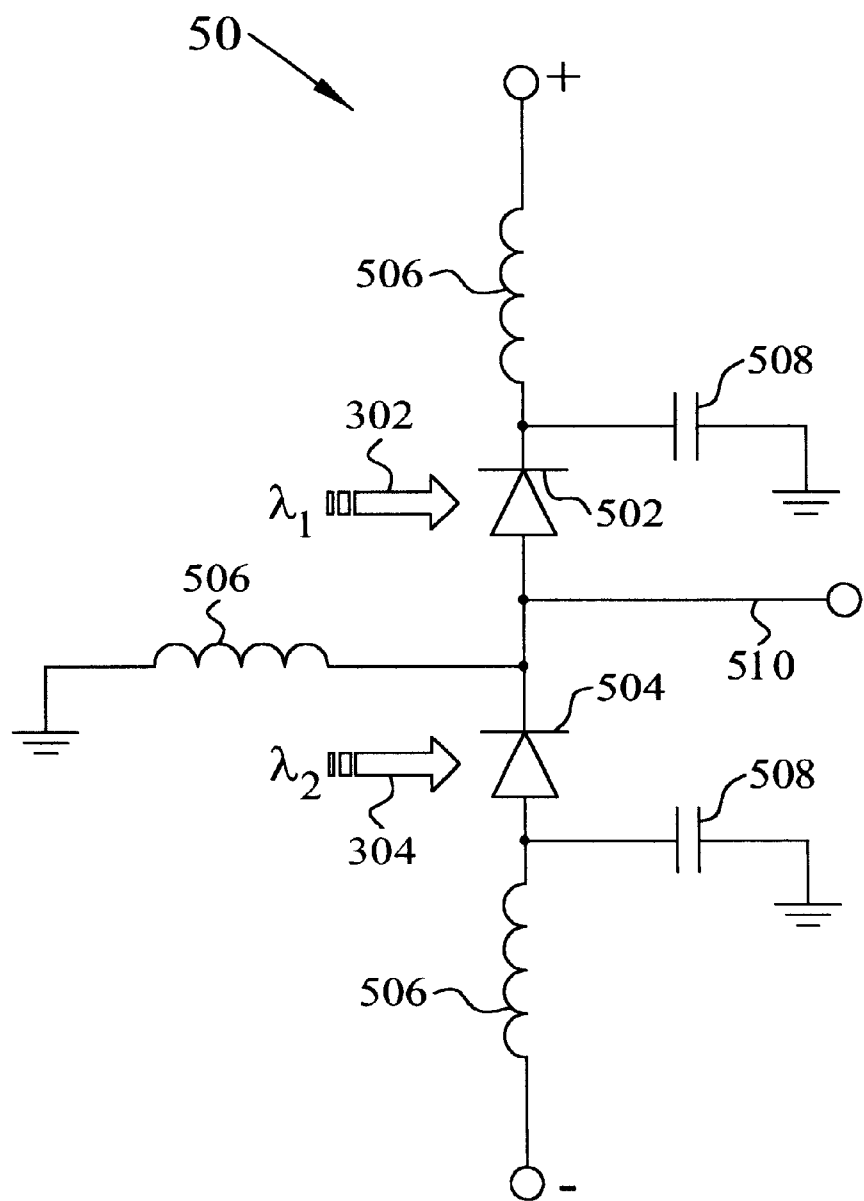
FIG. 5 is a schematic of an exemplary complementary RF power optical receiver.

FIG. 5 is a schematic of an exemplary complementary RF power optical receiver 50. Complementary RF optical power signals 302 and 304 are converted to an electrical signal representative of the input signal by optical receivers such as photodiodes 502 and 504. RF chokes 506 provide a DC path for providing a bias voltage to photodiodes 502 and 504, and bypass capacitors 508 provide a low impedance ground return for RF electrical output 510 generated by photodiodes 502 and 504 in response to complementary RF power signals 302 and 304. In this arrangement, photodiodes 502 and 504 are connected in series with opposing polarity to positive and negative supply voltages as shown. When photodiode 502 conducts, output 510 swings positive. When photodiode 504 conducts, output 510 swings negative. Because output 510 represents the difference of the linear portions of optical outputs 302 and 304, output 510 is substantially free of clipping effects due to high drive power. Alternatively, a wideband operational amplifier may be connected to -the-outputs of photodiodes in a common polarity configuration to generate a difference signal similar to output 510.

Figure 6:
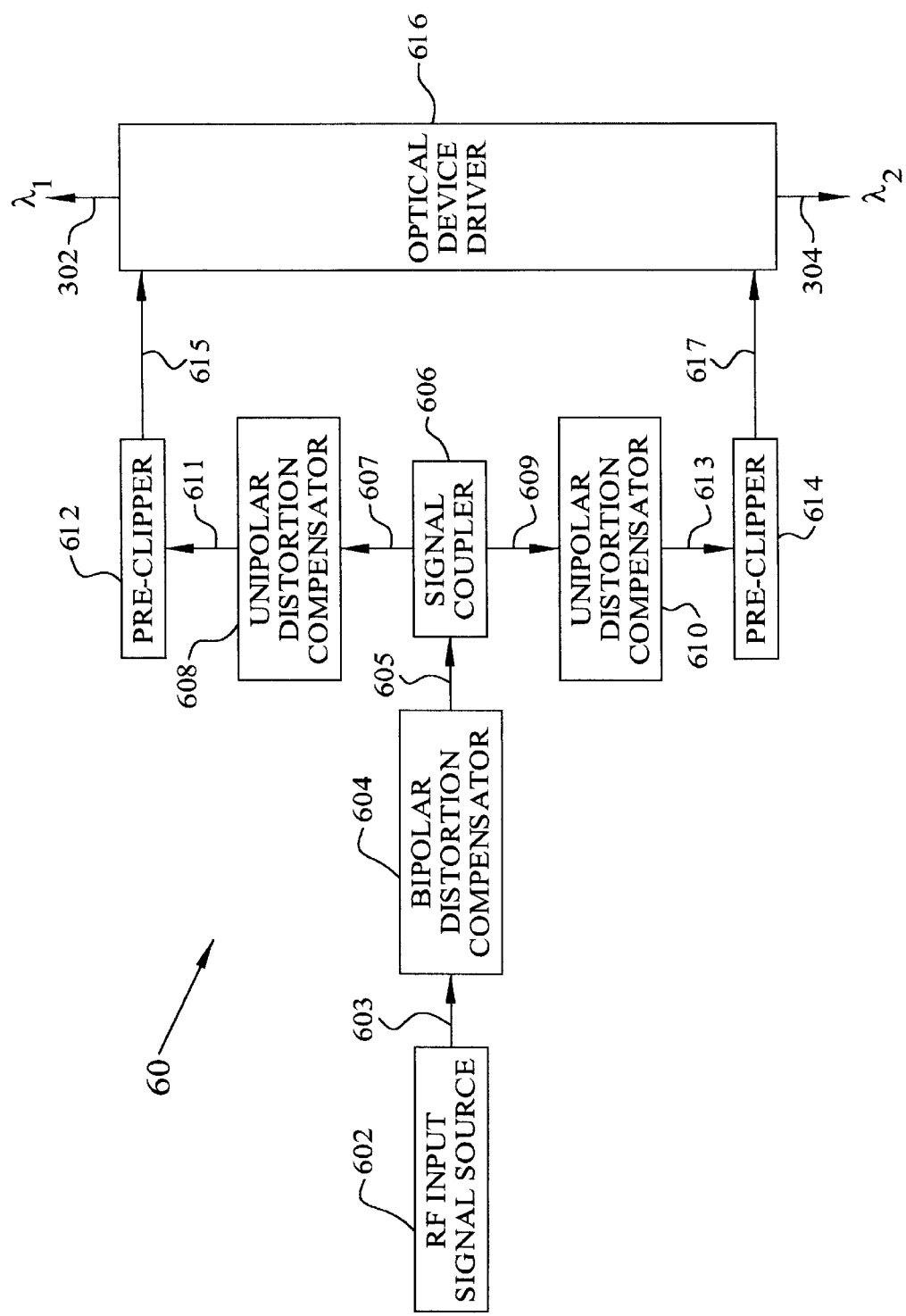
FIG. 6 is a block diagram of an optical dynamic range extender of the present invention.

FIG. 6 is a block diagram 60 for an optical dynamic range extender of the present invention. An RF input signal 603 is produced by source 602. A bipolar distortion compensator 604 applies a bipolar distortion compensation to RF input signal 603. An RF signal coupler 606 inputs compensated RF signal 605 and outputs an inverted compensated signal 607 and a non-inverted compensated signal 609. Unipolar distortion compensators 608 and 610 input inverted and non-inverted signals 607 and 609 and apply a unipolar distortion compensation to the forward current portions of inverted and non-inverted signals 607 and 609 respectively. Pre-clippers 612 and 614 input compensated inverted and non-inverted signals 607 and 609 and output complementary clipped signals 615 and 617 to optical device driver 616. Optical device driver 616 converts the electrical current of complementary clipped signals 615 and 617 to complementary optical power outputs 302 and 304 at wavelengths $\lambda_1$ and $\lambda_2$ respectively. In alternative embodiments, bipolar distortion compensator 604 and/or unipolar distortion compensators 608 and 610 may be omitted for specific applications.

Figure 2B:
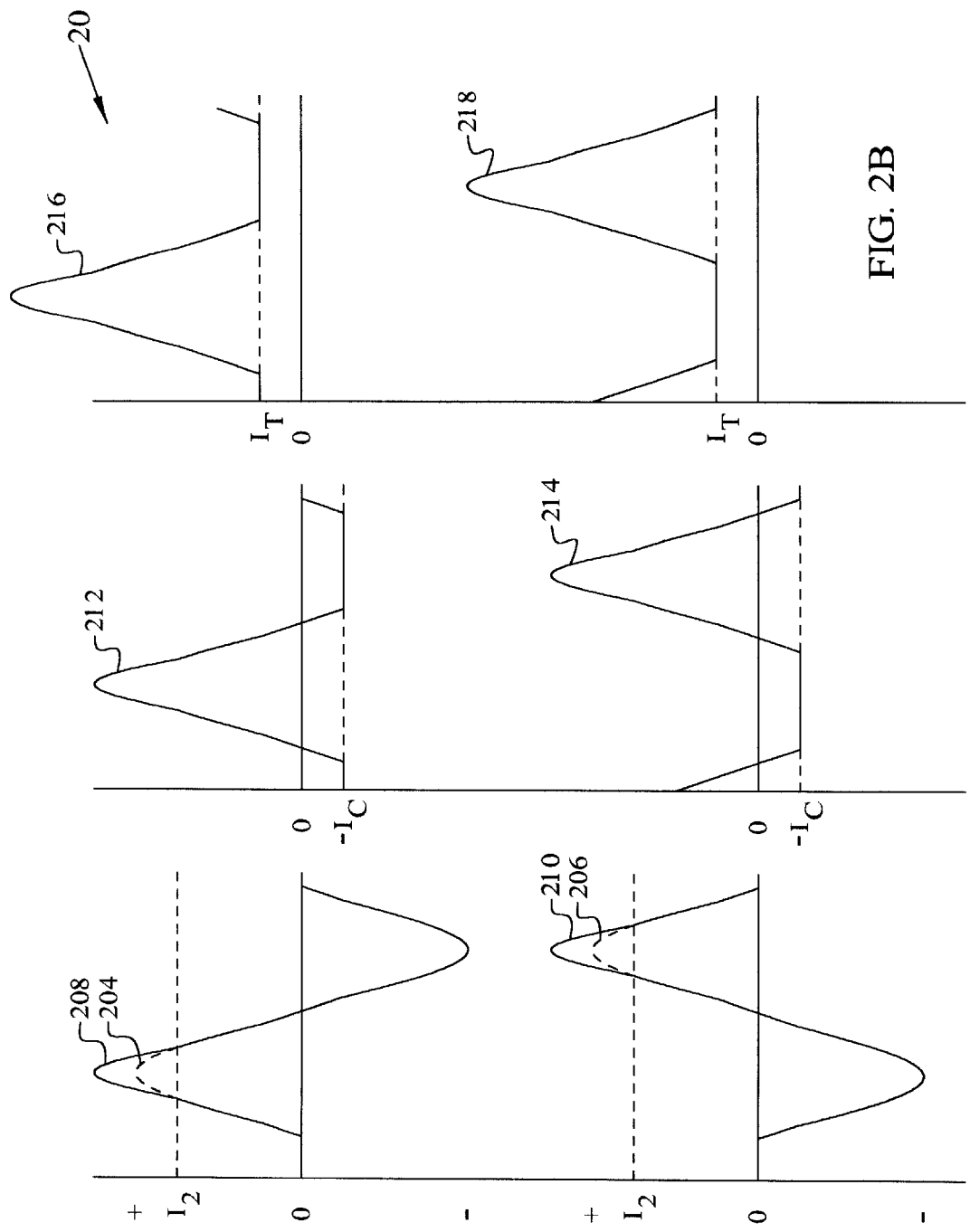
Figure 7:
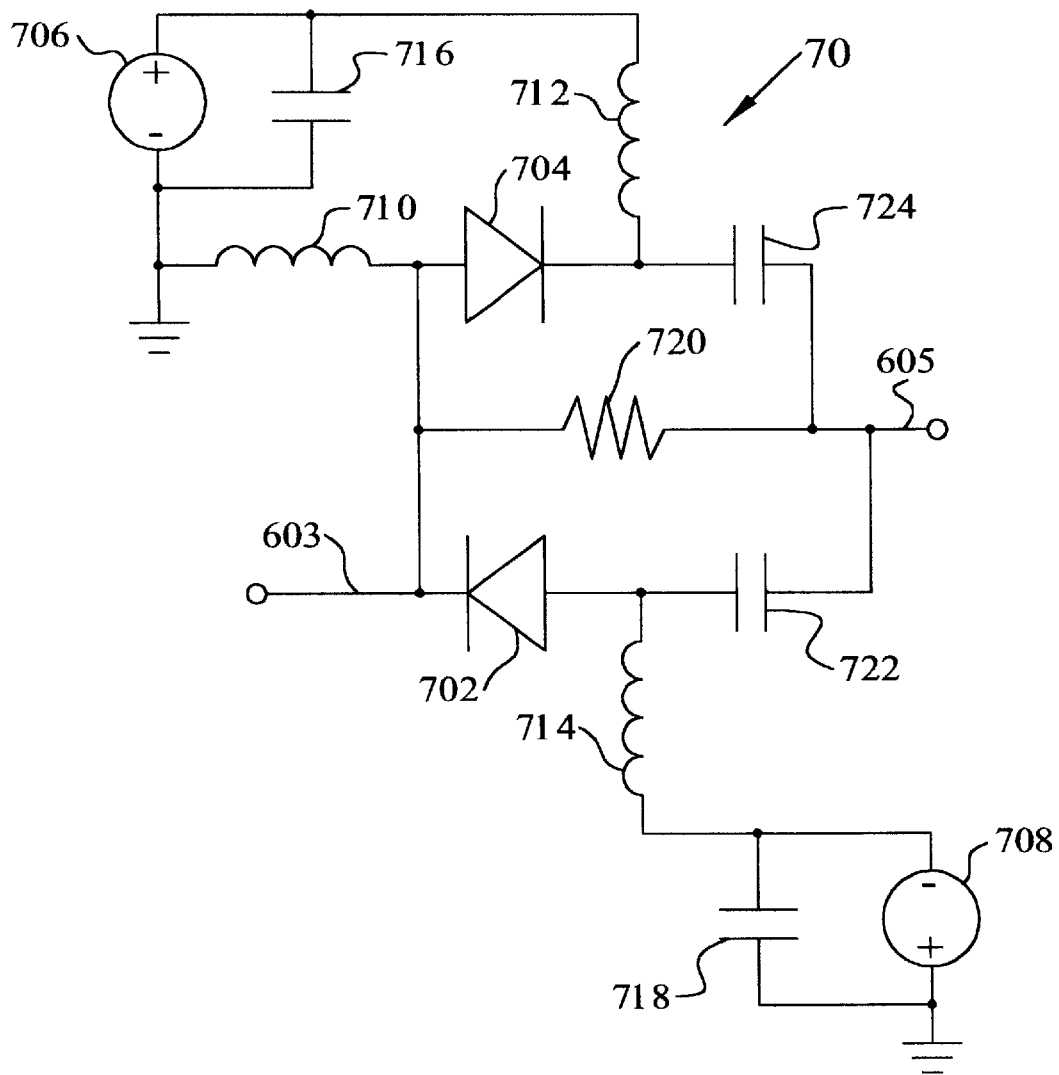
FIG. 7 is an exemplary schematic for a bipolar distortion compensator.

FIG. 7 is an exemplary schematic 70 for bipolar distortion compensator 604. Diodes 702 and 704 are connected in parallel with opposing polarity and respectively reverse biased by voltage sources 706 and 708. Diodes 702 and 704 may be, for example, Schottky diodes such as Hewlett-Packard part no. HSMS-286. RF chokes 710, 712, and 714 provide a DC return for the bias current while presenting a high impedance to the RF signal at input 603 and output 605. Bypass capacitors 716 and 718 provide a low impedance return for stray RF signals. A resistor 720, typically about 15Ω, provides an upper limit to the impedance between input 603 and output 605 at input RF current levels that are less than $I_1$ as shown in FIG. 2B. Voltage sources 706 and 708 establish a reverse bias for diodes 702 and 704. As the level of the input RF signal current increases beyond $I_1$, one of diodes 702 and 704 becomes increasingly conductive. The increased conductivity results in a corresponding increase in current, providing the bipolar distortion compensation shown in plot 204 of FIG. 2. Additional Schottky diodes may be connected in parallel to increase the distortion compensation.

Figure 8:
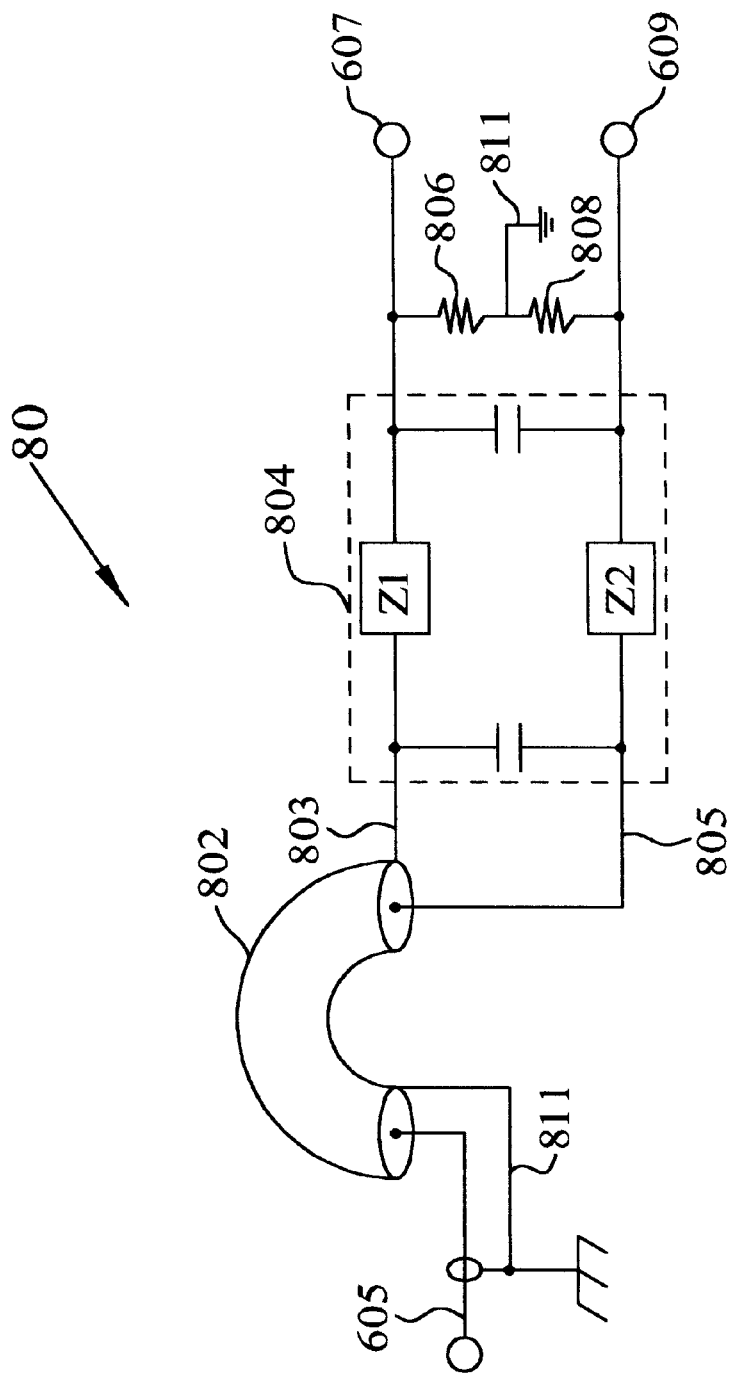
FIG. 8 is an exemplary schematic for a signal coupler.

FIG. 8 is an exemplary schematic 80 for signal coupler 606. A balun 802 transforms compensated signal 605 from a single-ended or unbalanced signal to complementary signals 803 and 805. Balun 802 may be, for example, a suitable length of coaxial cable. A matching impedance network 804 matches the output impedance of balun 802 to load resistors 806 and 808. Complementary compensated signals 607 and 609 are output with respect to input signal return 811 as represented in plots 204 and 206 of FIG. 2. Alternatives for signal coupler 606 include commercially available wideband hybrid couplers with 0° and 180° output ports and wideband RF differential amplifiers, not shown.

Figure 9:
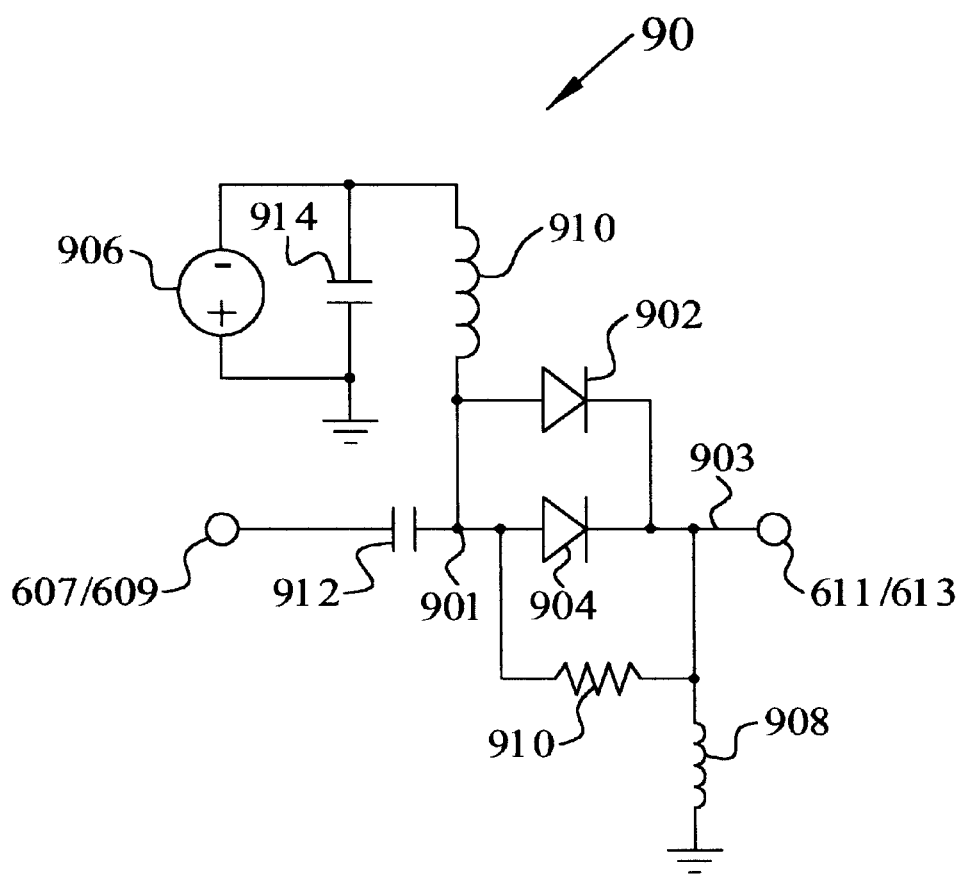
FIG. 9 is an exemplary schematic for a unipolar distortion compensator.

FIG. 9 is an exemplary schematic 90 for unipolar distortion compensators 608 and 610. Schottky diodes 902 and 904 are connected in parallel and are reverse biased by a DC voltage source 906. RF chokes 908 and 910 provide a low impedance circuit for the bias current while presenting a high impedance to the RF signal at input 607/609 and output 611/613. A resistor 910, typically about 15Ω, provides an upper limit to the impedance between input 607/609 and output 611/613 for input current levels that are less than $I_2$ as shown in FIG. 2B determined by the diode threshold voltage and voltage source 906. As the level of the input RF signal current increases, diodes 902 and 904 become increasingly conductive. The increased conductivity results in a corresponding increase in current, providing the unipolar distortion compensation shown in plots 208 and 210 of FIG. 2. Additional Schottky diodes may be connected in parallel to increase the distortion compensation.

Figure 10:
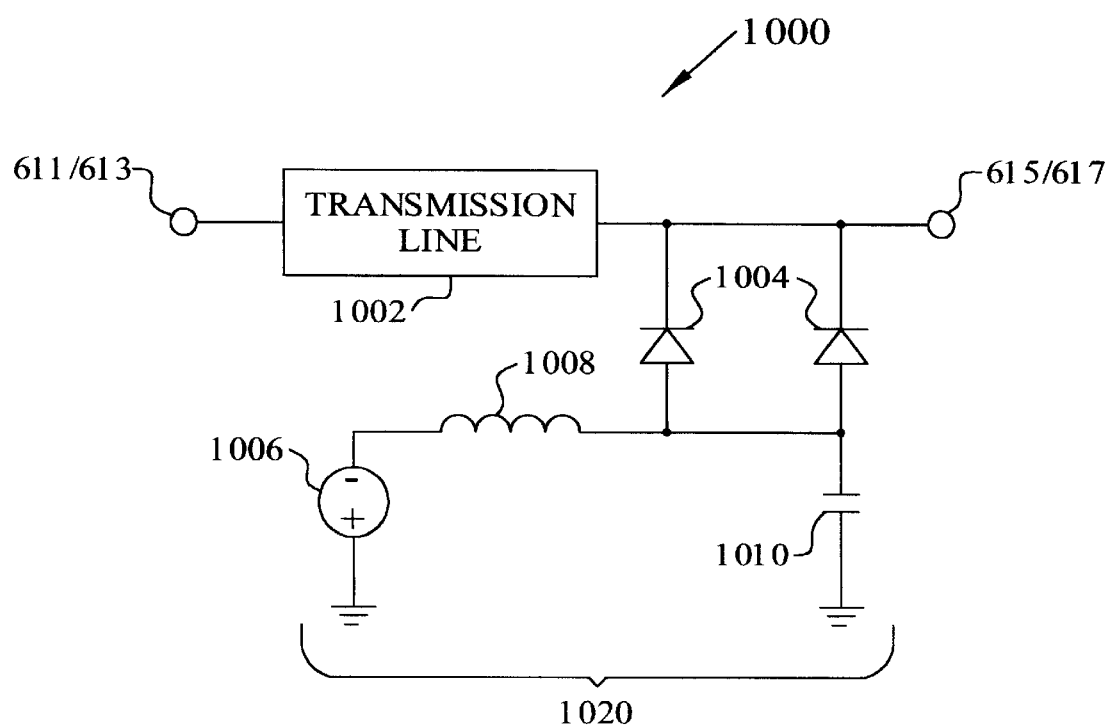
FIG. 10 is an exemplary schematic for a pre-clipper of the present invention.

FIG. 10 is an exemplary schematic 1000 for pre-clippers 612 and 614. A transmission line 1002 matches the impedance of complementary compensated signal 611/613 to Schottky diodes 1004. Schottky diodes 1004 are reverse biased at the clipping threshold by voltage source 1006. RF choke 1008 provides a low impedance circuit for the bias voltage, while bypass capacitor 1010 maintains a constant voltage at the clipping threshold when Schottky diodes 1004 are forward biased by complementary compensated signal 611/613. Additional pre-clipping stages 1020 may be connected to complementary clipped outputs 615/617 if desired to increase the clipping performance.

Figure 11:
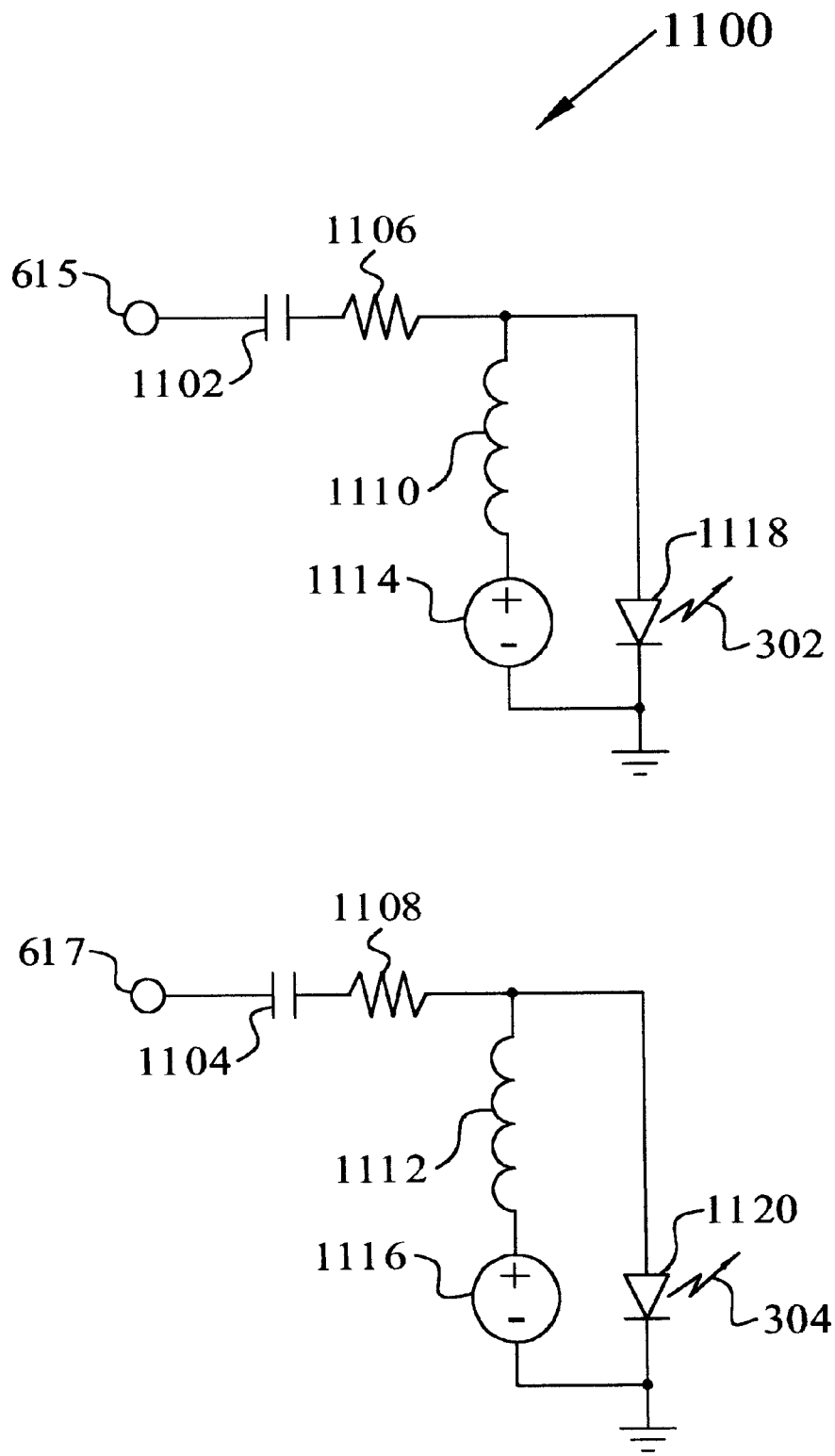
FIG. 11 is an exemplary schematic for an optical device driver.

FIG. 11 is an exemplary schematic 1100 for optical device driver 616. Bypass capacitors 1102 and 1104 block the clipping bias from clipped complementary outputs 615/617, while resistors 1106 and 1108 may be used to linearize the drive current for laser diodes that do not incorporate internal resistors. A typical value for resistors 1106 and 1108 is 15 Ohms. RF chokes 1110 and 1112 provide a low impedance path for DC voltage sources 1114 and 1116. DC voltage sources 1114 and 1116 generate an operating current bias for laser diodes 1118 and 1120. Laser diodes 1118 and 1120 produce complementary optical energy signals 302 and 304 at wavelengths $\lambda_1$ and $\lambda_2$ respectively corresponding to electrical waveforms 216 and 218 shown in FIG. 2B.

Figure 12:
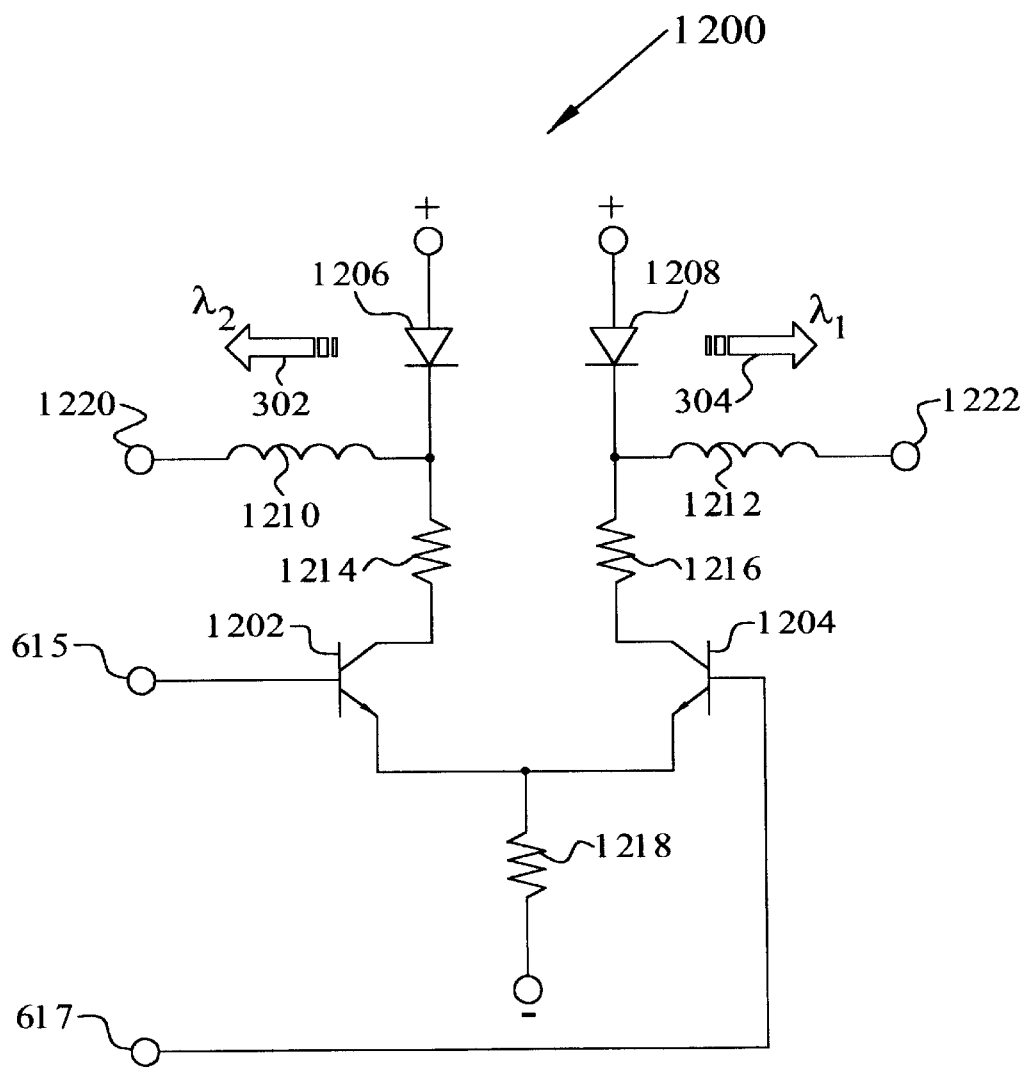
FIG. 12 is an alternative schematic for an optical device driver with a differential amplifier.

FIG. 12 is an alternative schematic 1200 for optical device driver 616. Biased, clipped complementary outputs 615/617 are differentially amplified by transistors 1202 and 1204 to drive laser diodes 1206 and 1208. RF chokes 1210 and 1212 provide a DC path for forward biasing laser diodes 1206 and 1208. The voltage from the plus and minus voltage sources and the values of resistors 1214, 1216, and 1218 determine the operating current range and limit the forward drive current through transistors 1202 and 1204 and may be selected so that differential transistors 1202 and 1204 perform the pre-clipping function.

In addition to avoiding direct signal clipping effects, the clipping compensator of the present invention avoids second-order intermodulation products by driving substantially identical optical transmitters with complementary signals. Subtracting the restored electrical signals from the modulated optical energy has been found to suppress second order distortion of the modulation signal introduced by the nonlinear transfer curves of laser diodes.

Alternatively, the diode polarities and the corresponding biasing source polarities may be reversed from that shown in the figures to practice the present invention.

Modifications and variations of the present invention may be made within the scope of the following claims to practice the invention otherwise than as described in the examples above.

We claim:

1. A dynamic range extender for optical transmitters comprising:
    a distortion compensator for coupling to an input signal to generate a compensated signal;
    a signal coupler coupled to the compensated signal to generate complementary compensated signals;
    a first and a second pre-clipper coupled to the complementary signals respectively for generating complementary clipped signals;
    and an optical device driver coupled to the complementary clipped signals for generating optical energy representative of the complementary clipped signals.

2. The dynamic range extender for optical transmitters of claim 1 further comprising a complementary optical receiver coupled to the optical device driver for generating an electrical current representative of the input signal.

3. The dynamic range extender for optical transmitters of claim 1 wherein the signal coupler is one of a balun, a hybrid coupler, and a differential amplifier.

4. The dynamic range extender for optical transmitters of claim 1 wherein the pre-clipper comprises one of a reverse biased Schottky diode and a differential transistor pair.

5. The dynamic range extender for optical transmitters of claim 1 wherein the optical device driver comprises a forward biased laser diode.

6. The dynamic range extender for optical transmitters of claim 1 wherein the optical device driver comprises a differential amplifier.

7. The dynamic range extender for optical transmitters of claim 1 wherein the distortion compensator comprises a reverse biased Schottky diode.

8. The dynamic range extender for optical transmitters of claim 1 wherein the distortion compensator is a bipolar distortion compensator.

9. A dynamic range extender for optical transmitters comprising:
    a bipolar distortion compensator for coupling to an input signal to generate a compensated signal;
    a signal coupler coupled to the compensated signal to generate complementary compensated signals;
    a first and second unipolar distortion compensator coupled to the complementary compensated signals respectively;
    a first pre-clipper coupled to the first unipolar distortion compensator and a second pre-clipper coupled to the second unipolar distortion compensator respectively for generating complementary clipped signals;
    and an optical device driver coupled to the complementary clipped signals for generating optical energy representative of the complementary clipped signals.

10. The dynamic range extender for optical transmitters of claim 9 further comprising a complementary optical receiver coupled to the optical device driver for generating an electrical current representative of the input signal.

11. The dynamic range extender for optical transmitters of claim 10 wherein the complementary optical receiver is coupled to the optical device driver by an optical fiber.

12. The dynamic range extender for optical transmitters of claim 9 wherein the signal coupler is one of a balun, a hybrid coupler, and a differential amplifier.

13. The dynamic range extender for optical transmitters of claim 9 wherein the pre-clipper comprises one of a reverse biased Schottky diode and a differential transistor pair.

14. The dynamic range extender for optical transmitters of claim 9 wherein the optical device driver comprises a forward biased laser diode.

15. The dynamic range extender for optical transmitters of claim 9 wherein the optical device driver comprises a differential amplifier.

16. The dynamic range extender for optical transmitters of claim 9 wherein the distortion compensators each comprise a reverse biased Schottky diode.

* * * * *